US005542797A

United States Patent [19]

Obermeier

[11] Patent Number: 5,542,797

[45] Date of Patent: Aug. 6, 1996

[54] TOOL BIT AND TOOL BIT CHUCK FOR MANUALLY OPERATED TOOLS

[75] Inventor: Josef Obermeier, Peiting, Germany

[73] Assignee: Hilti Aktiengesellschaft, Schaan, Liechtenstein

[21] Appl. No.: 351,911

[22] Filed: Dec. 8, 1994

[30] Foreign Application Priority Data

Dec. 9, 1993 [DE] Germany .......................... 43 41 971.2

[51] Int. Cl.[6] ............................ B23B 51/02; B23B 31/22

[52] U.S. Cl. ............................ 408/226; 279/19; 408/240

[58] Field of Search ................................ 408/226, 239 R, 408/239 A, 240; 279/19, 19.2, 19.3, 19.4, 19.5, 19.6, 75

[56] References Cited

U.S. PATENT DOCUMENTS

| | | | |
|---|---|---|---|
| 4,107,949 | 8/1978 | Wanner et al. | 279/75 |
| 4,943,192 | 7/1990 | Lafforgue et al. | 408/226 |
| 5,028,057 | 7/1991 | Wanner | 408/226 |
| 5,076,371 | 12/1991 | Obermeier et al. | 279/75 |
| 5,324,145 | 6/1994 | Kleine | 408/226 |
| 5,397,203 | 3/1995 | Kleine et al. | 279/75 |

*Primary Examiner*—Daniel W. Howell
*Attorney, Agent, or Firm*—Anderson Kill Olick & Oshinsky, P.C.

[57] ABSTRACT

A tool for insertion into a tool bit chuck in a manually operated tool used for chiseling and/or percussion drilling includes an axially extending chucking shank (1) with a locking 1groove (2) closed at its ends spaced apart in the axial direction. The chucking shank (1) has two rotary entrainment grooves (3) each with an entrainment side flank arranged so that the entrainment side flanks are located diametrically opposite one another. One of the rotary entrainment grooves (3) extends in the axial direction through a part of another locking groove (4) in such a way that the locking of the tool bit in a chuck is improved. To increase the transmission of torque, the chucking shank (1) has at least one additional axially extending groove (5). With this groove arrangement of the chucking shank (1) the tool bit is useful with a correspondingly shaped tool bit chuck as well as with different commercially available chucks.

10 Claims, 2 Drawing Sheets

TOOL BIT AND TOOL BIT CHUCK FOR MANUALLY OPERATED TOOLS

BACKGROUND OF THE INVENTION

The present invention is directed to a tool bit for insertion into a tool bit chuck in a manually operated tool used for chiseling and/or percussion drilling and includes an axially extending chucking shank having at least two rotary entrainment grooves open at the end of the shank inserted into the tool bit chuck. Each rotary entrainment groove has an entrainment side flank with such flanks located diametrically opposite one another. In addition, the shank has at least one locking groove closed at its ends extending transversely of the axial direction and located between the rotary entrainment grooves.

Tool bits for manually operated tools are disclosed in DE-PS 25 51 125 with the chucking shanks of such tool bits having at least one locking groove closed at its end extending transversely of the axial direction along with two rotary entrainment grooves open at the end of the shank inserted into the chuck. The tool bit chuck for the tool bit has at least one radially displaceable locking element in the shape of a sphere or ball or possibly in the shape of a roller. A positively locked connection between the tool bit and the chuck in the axial direction is established by the cooperation of the locking element with the locking groove.

This positive connection serves to assure that the tool bit is secured in the tool bit chuck. Neither the locking groove nor the locking element is exposed to particularly high stresses in the manner in which the shank is held in the chuck. Larger stresses could arise if the tool bit must be pulled out of a bore in a structural member by means of the hand-held tool when under some circumstances forces due to jamming or seizing phenomena must be overcome. In such cases excessive stresses can occasionally occur when the tool bit is pulled out of the chuck in an undesirable manner. Greater problems are experienced in the known tool bit when, based on the torque to be transmitted, premature wear of the shank occurs. Such problems tend to increase, since the trend is to provide manually operated tools with increased output for enabling the utilization of drilling tool bits of the greater diameter. Under such circumstances the torque to be transmitted is so high that the available surface of the entrainment-side flanks of the rotary entrainment grooves are too small with the result that high specific surface pressure develops and a premature failure of the tool bit occurs due to wear. This failure of the chucking shank due to wear generally occurs prior to the normal wear of the working region of the tool bit under normal use. Thus the economy of such very expensive tool bits is especially questioned.

SUMMARY OF THE INVENTION

Therefore, the primary object of the present invention is to provide a tool bit whose chucking shank in cooperation with a suitable chuck is not subjected to premature wear leading to failure.

In accordance with the present invention, at least one of the rotary entrainment grooves extends axially through a part of an additional locking groove so that an end face of the locking groove is formed and directed away from the end of the shank inserted into the chuck and at least one additional axially extending groove open toward the end of the shank located within the chuck is positioned between the rotary entrainment grooves and is located opposite the locking groove.

Advantages are achieved in two ways with inventive tool bit in connection with a suitable tool bit chuck. First, the positive connection in the axial direction can be improved by the additional locking groove. The additional locking groove affords the arrangement of an additional locking element which cooperates with the end face directed away from the end of the shank inserted into the chuck. As a result, a notable increase of the axially transmittable forces is afforded, whereby no problems arise in the structural member itself even when the tool bit becomes jammed and is pulled out of the bore.

A considerably greater advantage is achieved by the inventive tool bit in cooperation with a suitable tool bit chuck in that higher torque can be transmitted due to the additional axially extending groove, since the surface area of the entrainment side flanks is considerably increased. Accordingly, the tool bit wear is considerably reduced, so that failure of the tool bit does not occur due to premature wear of the chucking shank.

The interior cross-sectional shape of the rotary entrainment grooves as well as that of the axially extending grooves can be completely different. Thus the rotary entrainment grooves and the additional axially extending grooves can be U-shaped, V-shaped or have a flattened shape, wherein it is important that the entrainment side flank at least in part extends essentially radially.

To permit the use of the inventive tool in tool bit chucks corresponding for instance to the DE-PS 25 51 125 disclosure, preferably the rotary entrainment grooves have different angular spacings relative to the locking grooves.

Compatibility with another commercially available tool bit chuck is achieved if the additional locking groove is located diametrically opposite one of the rotary entrainment grooves. In such an arrangement, the rotary entrainment groove located opposite the additional locking groove must have a sufficiently large interior cross-section. In such an instance, the tool bit chuck has a locking element located diametrically opposite an entrainment strip. Apart from the advantage of compatibility, no additional advantage is obtained when using the inventive tool bit in such a known tool bit chuck, especially not with regard to any increase of the surface area of the entrainment side flanks determining the transmittal of torque.

To further assure the compatibility with the tool bit chuck in DE-PS 25 51 125, preferably two rotary entrainment grooves are located diametrically opposite one another. Here we are also dealing with the advantages concerning a transmission of greater torque.

To afford an improvement in axial locking, in particular the formation of the large end face directed away from the end of the chucking shank inserted into the chuck, one of the rotary entrainment grooves extends axially for a part of the additional locking groove in such a way that the angular spacings relative to the axis of symmetry of the additional locking groove are unequal. With such an arrangement an offset in the circumferential direction with respect to the locking element can be afforded, especially in connection with the feasibility of use in a tool bit chuck corresponding to the DE-PS 25 51 125. The possibility of using the inventive tool bit in a tool bit chuck of this type is not impaired by such offset, since the tolerances involved in manufacturing assure an adequate locking of the tool bit. If these tolerances should be insufficient, an increase of the offset in the locking groove does not affect the functionality of the tool.

Preferably, the additional axially extending groove is provided for achieving in the invention the advantages of increased torque transmission. Certain advantages are achieved during fabrication, if the additional axially extending groove lies diametrically opposite the locking groove.

Analogous advantages with respect to tool bit chucks available commercially with one or two locking elements located diametrically opposite one another can be achieved if several additional axially extending grooves are used. The arrangement of several axially extending grooves affords the possibility of maintaining the critical diameter affecting weakening of the chucking shank.

Since the additional axially extending grooves can be designed to be sufficiently different with regard to their interior cross-sectional shape, the groove shape is to be interpreted so loosely that flattened arrangements are also included with the additional axially extending grooves provided at least in part with entrainment side flanks extending substantially radially. The essentially radially extending region of the entrainment side flanks creates optimum wear reduction conditions while transmitting the operating torque.

As has been pointed out, the inventive tool bit has the advantage that it is compatible with various commercially available tool bit chucks. Such compatibility is achieved while not completely gaining the advantages of the invention. The advantages of the invention are obtained if the inventive tool bit is used in a tool bit chuck with at least one radially displaceable locking element cooperating with the axially closed locking grooves, and at least two entrainment strips cooperating with the rotary entrainment grooves open at the end of the chucking shank along with at least one additional axially extending strip cooperating with the additional axially extending groove also open at the end of the chucking shank fitted into the chuck.

In addition to the arrangement of the additional axial extending strip which increases the torque to be transmitted, there is the further possibility of improving the axial locking afforded by the inventive tool bit chuck by employing an additional locking element. Contrary to conventional chucks enjoying wide use, where the second locking element is located basically diametrically opposite the first, in the present invention there is the possibility of positioning the second locking element offset from the first through approximately 90°. This second locking element can extend through one entrainment strip in radial direction without any detrimental influence on the transmission of the torque.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are described preferred embodiments of the invention.

DETAILED DESCRIPTION OF THE INVENTION

Figure 1:
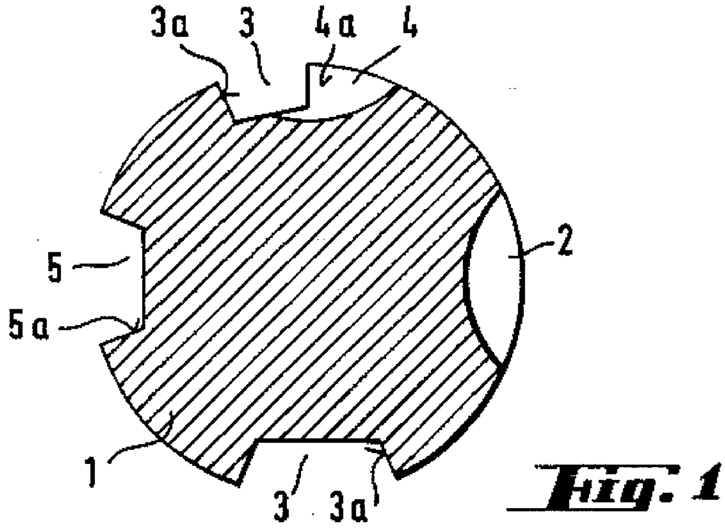
FIG. 1 is a transverse cross-sectional view through a chucking shank of a tool bit embodying the present invention.

In FIG. 1 an axially extending chucking shank 1 of an axially extending tool bit is shown with a locking groove 2 closed at its opposite ends extending transversely of the axial direction and formed in the outside surface of the shank. Further, the chucking shank 1 has two rotary entrainment grooves 3 located on opposite sides of the shank and each has an entrainment side flank 3*a* located essentially diametrically opposite the other. One of the rotary entrainment grooves 3 extends axially through at least a part of an additional locking groove 4 so that an end face 4*a* is formed facing away from the end of the chucking shank 1 fitted into the chuck, not shown. An additional axially extending groove 5 with an entrainment side flank 5*a* is located diametrically opposite the locking groove 2.

Figure 2:
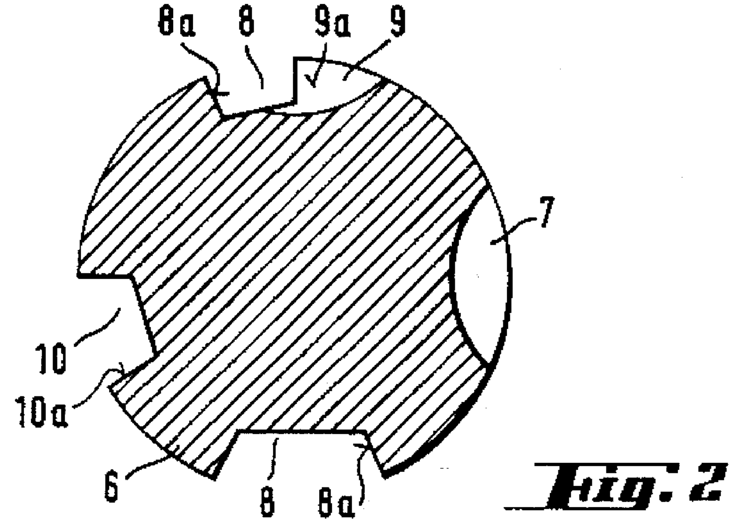
FIG. 2 is a transverse cross-sectional view through a clamping shank of another tool bit embodying the present invention.

In FIG. 2, an axially extending tool bit has an axially extending chucking shank 6 provided with a locking groove 7 closed at its ends extending transversely of the axial direction and formed in the outside surface of the shank. In addition, the shank has two rotary entrainment grooves 8 each provided with an entrainment side flank 8*a* located diametrically opposite one another. One of the rotary entrainment grooves 8 extends axially through a part of an additional locking groove 9 so that an end face 9*a* of the locking groove 9 is formed directed away from the end of the chucking shank 6 fitted into the chuck. An additional axially extending groove 10 with an entrainment side flank 10*a* is located in the region of the chucking shank 6 located opposite the locking groove 7, however, it is not located diametrically opposite the locking groove.

Figure 3:
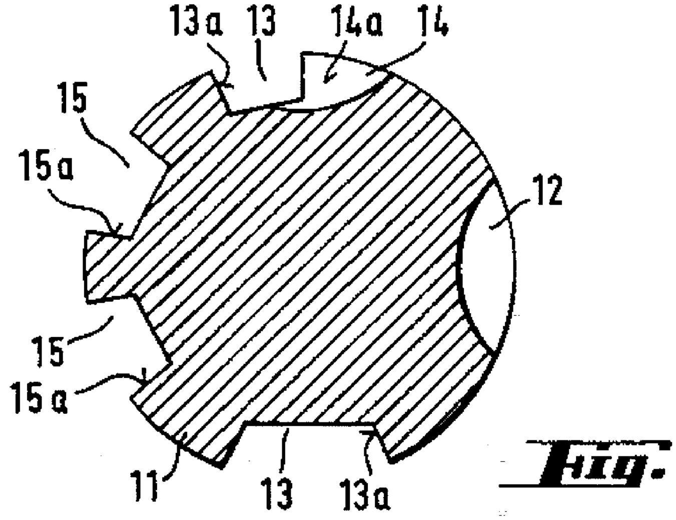
FIG. 3 is another transverse cross-sectional view through a clamping shank in still another tool bit embodying the present invention.

In FIG. 3 another tool bit is shown with an axially extending chucking shank 11 having a locking groove 12 closed at its end extending transversely of the axial direction and formed in the outside surface of the shank. The chucking shank 11 has two rotary entrainment grooves 13 each with an entrainment side flank 13*a* with the entrainment side flanks located essentially diametrically opposite one another. One of the rotary entrainment grooves 13 extends axially through a second locking groove 14 so that an end face 14*a* of the groove is formed directed away from the end of the chucking shank 11 located in the chuck. Unlike the tool bits in FIGS. 1 and 2, the chucking shank 11 has two angularly spaced additional axially extending grooves 15 each with an entrainment side flank 15*a*. The additional axially extending grooves 15 are located on the opposite side of the chucking shank 11 from the locking groove 12.

As illustrated in each of the FIGS. 1–3, one of the rotary entrainment grooves 3, 8, 13 has an interior cross-sectional area smaller than the other. The larger cross-sectional area is intended merely to demonstrate the possibility of compatibility with a tool bit chuck available commercially having an entrainment strip designed in this manner. The disposition in the present invention of the entrainment side flanks 3*a*, 8*a*, 13*a*, governing as used in the inventive tool bit chuck, is important and decisive when used in a tool bit chuck of the known type mentioned above as well as when it is used in a tool bit chuck corresponding to that in DE-PS 25 51 125.

Figure 4:
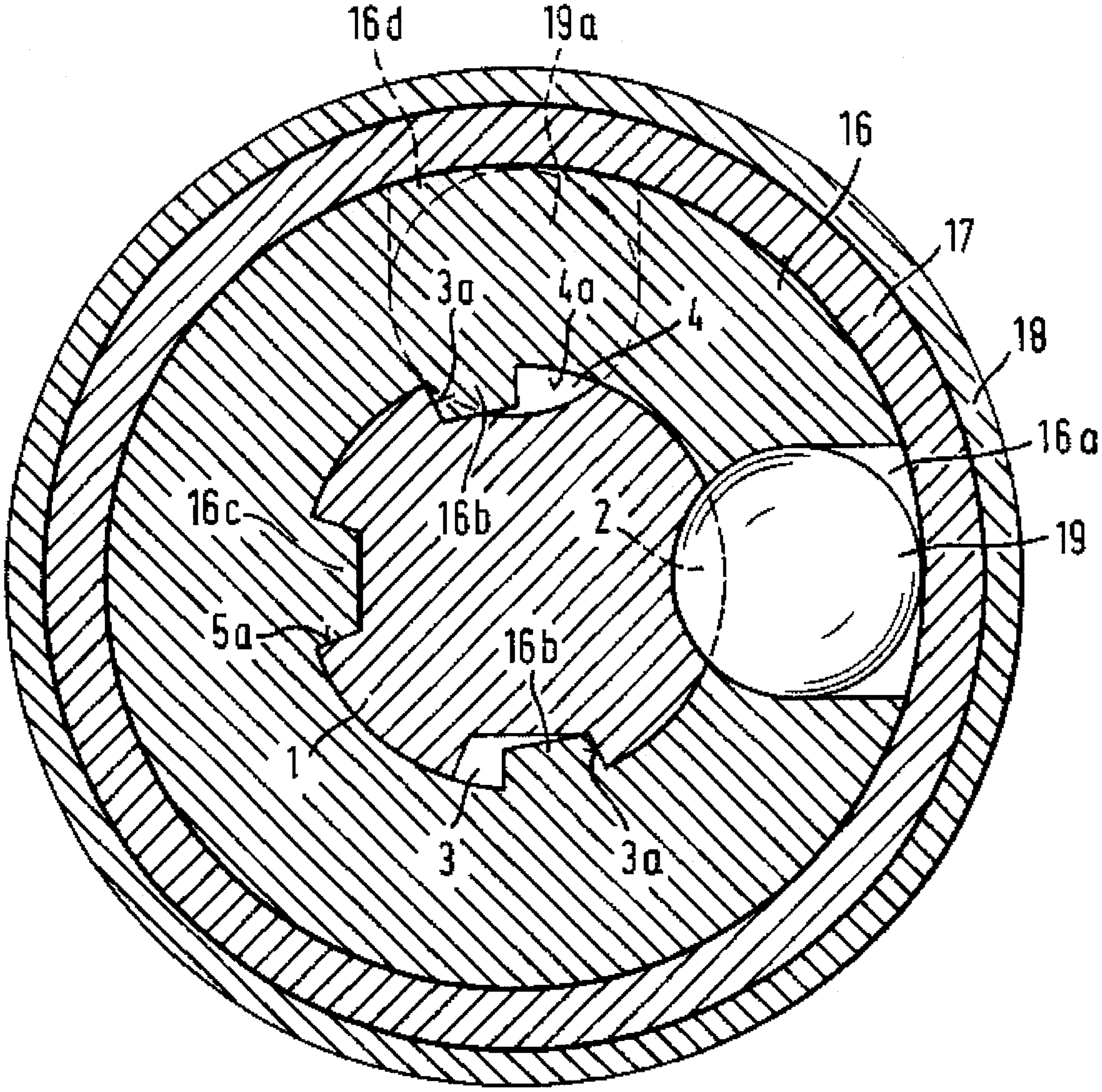
FIG. 4 is a cross-sectional view through a tool bit chuck containing the chucking shank of the tool bit shown in FIG. 1 and illustrated in a simplified manner.

FIG. 4 shows a section through a tool bit chuck for a tool bit having a chucking shank 1 corresponding to that in FIG. 1 and displayed in a simplified manner. The tool bit chuck has an annular guide 16, an actuation ring 17 encircling the guide, and a cage 18 encircling the actuation ring. A locking element 19, in the shape of a ball, is radially displaceable in the guide 16 inside an opening 16*a*. In addition, the guide 16 has two axially extending entrainment strips 16*b* and an additional axially extending strip 16*c*. The entrainment strips 16*b* as well as the additionally extending strip 16*c* serve for transmitting the torque.

FIG. 4 shows the manner in which it is possible to use the entrainment strips 16*b* located diametrically opposite one another where one of the entrainment strips 16*d* does not completely fill the corresponding rotary entrainment groove 3, since only the cooperation of the entrainment-side flanks 3*a* is significant for transmitting the torque.

A displacement of one of the entrainment strips 16*b* in the circumferential direction is shown in the embodiment displayed in FIG. 4. This displacement is achieved by the arrangement of the entrainment side flank 3*a* with an enlarged configuration of the interior cross-section of one of the rotary entrainment grooves 3. Such arrangement affords compatibility of the inventive tool bit with a commercially available tool bit chuck. In addition to the sufficiently large end face 4*a* formed by this displacement, as shown particularly in FIG. 1, there is the possibility of providing an additional locking element 19*a* shown in phantom in FIG. 4. This additional locking element 19*a* is supported in an opening 16*d* so that it is radially displaceable. The use of the inventive tool bit with rotary entrainment grooves of this type is also possible in tool bit chucks with a locking element 19 arranged so as not to be displaceable and this in view of existing manufacturing tolerances.

While specific embodiments of the invention have been shown and described in detail to illustrate the inventive principles, it will be understood that the invention may be embodied otherwise without departing from such principles.

I claim:

1. Tool bit for insertion into a tool bit chuck in a manually operated tool used for at least one of chiseling and percussion drilling, said tool bit comprising an axially extending chucking shank (1, 6, 11) with an axially extending outside surface and a first end for insertion into the tool bit chuck, said shank (1, 6, 11) having at least two axially extending rotary entrainment grooves (3, 8, 13) in the outside surface thereof and open at the first end thereof, each of said rotary entrainment grooves (3, 8, 13) having at least one axially extending entrainment-side flank (3*a*, 8*a*, 13*a*) located diametrically opposite the other, at least one first locking groove (2, 7, 12) located in the outside surface between said rotary entrainment grooves (3, 8, 13), wherein the improvement comprises that at least one of said rotary entrainment grooves (3, 8, 13) extends axially through at least an axially extending part of a second locking groove (4, 9, 14) with said second locking groove forming an end face extending transversely of the axial direction and facing away from the first end of said chucking shank (1, 6, 11), and at least one additional axially extending groove (5, 10, 15) formed in the outside surface and being open at the first end of said chucking shank (1, 6, 11) and located opposite said first locking groove (2, 7, 12) and between said rotary entrainment grooves (3, 8, 13).

2. Tool bit, as set forth in claim 1, wherein said entrainment-side flanks (3*a*, 8*a*, 13*a*) of said rotary entrainment grooves (3, 8, 13) have different angular spacings with respect to said first locking groove (2, 7, 12).

3. Tool bit, as set forth in claim 1 or 2, wherein said additional locking groove (4, 9, 14) is located opposite one of said rotary entrainment grooves (3, 8, 13).

4. Tool bit, as set forth in claim 1 or 2, wherein two of said rotary entrainment grooves (3, 8, 13) are located diametrically opposite one another.

5. Tool bit, as set forth in claim 4, wherein said the one of said rotary entrainment grooves (3, 8, 13) extending axially through said second locking groove (4, 9, 14) is offset relative to an axis of symmetry of said second locking groove (4, 9, 14).

6. Tool bit, as set forth in claim 1 or 2, wherein said additional axially extending groove (5) is located diametrically opposite said first locking groove (2).

7. Tool bit, as set forth in claim 1 or 2, wherein a plurality of said additional axially extending grooves (15) spaced angularly apart are located in the outside surface of said chucking shank (11).

8. Tool bit, as set forth in claim 1, wherein said additional axially extending groove (5, 10) has an entrainment side flank (5*a*, 10*a*) extending at least in part substantially radially.

9. Tool bit, as set forth in claim 7, wherein said additional axially extending grooves (15) having entrainment side flanks (15*a*) extending at least in part substantially radially.

10. Tool bit chuck having an opening for receiving said tool bit, as set forth in claim 1 or 2, wherein said chuck has at least one radially displaceable locking element (19, 19*a*) cooperating with said first locking groove (2, 7, 12) and at least two rotary entrainment strips (16*a*) cooperating with said rotary entrainment grooves (3, 8, 13) which are open at the first end of said chucking shank (1, 6, 11), and at least one additional axially extending strip (16*c*) cooperating with said additional axially extending groove (5, 10, 15) which is axially open at the first end of said chucking shank (1, 6, 11).

* * * * *